(12) United States Patent
Miyazaki et al.

(10) Patent No.: US 10,871,664 B2
(45) Date of Patent: Dec. 22, 2020

(54) OPTICAL MODULATOR

(71) Applicant: Sumitomo Osaka Cement Co., Ltd., Tokyo (JP)

(72) Inventors: Norikazu Miyazaki, Tokyo (JP); Yuu Kataoka, Tokyo (JP)

(73) Assignee: Sumitomo Osaka Cement Co., Ltd., Tokyo (JP)

(*) Notice: Subject to any disclaimer, the term of this patent is extended or adjusted under 35 U.S.C. 154(b) by 0 days.

(21) Appl. No.: 16/525,467

(22) Filed: Jul. 29, 2019

(65) Prior Publication Data
US 2020/0033646 A1   Jan. 30, 2020

(30) Foreign Application Priority Data
Jul. 30, 2018   (JP) .................................. 2018-142792

(51) Int. Cl.
*G02F 1/035*   (2006.01)
*G02F 1/03*   (2006.01)

(52) U.S. Cl.
CPC ............ *G02F 1/035* (2013.01); *G02F 1/0305* (2013.01); *G02F 2202/20* (2013.01)

(58) Field of Classification Search
CPC ..... G02F 1/035; G02F 2202/20; G02F 1/0305
See application file for complete search history.

(56) References Cited

U.S. PATENT DOCUMENTS

| 2010/0232737 A1 | 9/2010 | Sugiyama et al. |
| 2017/0115546 A1 | 4/2017 | Doi et al. |
| 2018/0081251 A1 | 3/2018 | Takeuchi et al. |

*Primary Examiner* — Leslie C Pascal
(74) *Attorney, Agent, or Firm* — IpHorgan Ltd.

(57) ABSTRACT

An optical modulator includes an optical waveguide formed on a substrate and modulates a light wave propagating through the optical waveguide, in which the optical waveguide has a configuration in which a plurality of branching parts are connected to each other in multiple stages, each of branched waveguides branched from a branch point of a first branching part among the plurality of branching parts has a transition curve of which a curvature changes, in a predetermined section from the branch point, each of the branched waveguides is formed by the transition curve starting from a curvature of 0, and a curvature change and a width change of the optical waveguide are set to be symmetric between the branched waveguides, and second branching parts formed in the respective branched waveguides are disposed at different positions between the branched waveguides in a direction along a propagation axis of the optical waveguide.

3 Claims, 7 Drawing Sheets

FIG. 8

OPTICAL MODULATOR

CROSS-REFERENCE TO RELATED APPLICATIONS

This application claims the benefit of Japanese Patent Application No. 2018-142792 filed Jul. 30, 2018, the disclosure of which is herein incorporated by reference in its entirety.

BACKGROUND OF THE INVENTION

Field of the Invention

The present invention relates to an optical modulator, and particularly to an optical modulator in which an optical waveguide formed on a substrate has a configuration in which a plurality of branching parts are connected to each other in multiple stages.

Description of Related Art

In an optical communication field or an optical measurement field, an optical waveguide device such as an optical modulator is heavily used. Particularly, in a nest type optical modulator or a polarization combining type optical modulator having a structure of a plurality of Mach-Zehnder type optical waveguides, there is a desire for an optical modulator excellent in miniaturization of a device size, optical characteristics, or high-frequency characteristics.

In a nest type or a polarization combining type optical modulator in which a plurality of modulation units are integrated in parallel, it is problematic to dispose an arrangement wiring from a connection terminal (pad portion) in a substrate of the modulator to a modulation start point. Specifically, a size of the substrate is increased or an arrangement line path is increased in order to secure an arrangement space for lines such that a high-frequency signal attenuates, and thus deterioration in high-frequency characteristics tends to occur.

In order to suppress deterioration in optical characteristics such as an optical loss, it is necessary to reduce a curvature of an optical waveguide, and thus a size of a substrate is increased such that it is difficult to miniaturize an optical modulator.

Japanese Patent Nos. 6233480, 5233765, and 6220836 disclose that, in a case where a plurality of modulation units are integrated in parallel, a modulation start point of each modulation unit is disposed to be deviated with respect to a propagation direction of a light wave. Consequently, it is possible to reduce an arrangement wiring and thus to an increase in a substrate size. However, with respect to branched waveguides branched from a branching part, positions of branching parts on subsequent stages provided in the respective branched waveguides are different from each other, and thus curvatures or bending methods of the branched waveguides are naturally different from each other. As a result, it is difficult to divide a light wave in a branching part at a one-to-one branch ratio or to set losses of light waves propagating through respective branched waveguides to be the same as each other.

SUMMARY OF THE INVENTION

An object of the present invention is to solve the problem and thus to provide an optical modulator in which an arrangement wiring is reduced, a branch ratio in a branching part can be maintained to be a one-to-one ratio, and losses of light waves propagating through respective branched waveguides can be maintained to be the same as each other.

In order to achieve the object, an optical modulator of the present invention has the following technical features.

(1) An optical modulator includes an optical waveguide formed on a substrate, and modulates a light wave propagating through the optical waveguide, in which the optical waveguide has a configuration in which a plurality of branching parts are connected to each other in multiple stages, in which each of branched waveguides that are branched from a branch point of a first branching part among the plurality of branching parts has a transition curve of which a curvature changes, in which, in a predetermined section from the branch point, each of the branched waveguides is formed by the transition curve starting from a curvature of 0, and a curvature change and a width change of the optical waveguide are set to be symmetric between the branched waveguides, and in which second branching parts formed in the respective branched waveguides are disposed at different positions between the branched waveguides in a direction along a propagation axis of the optical waveguide.

(2) In the optical modulator according to (1), an endpoint of the predetermined section is a position where a distance between the branched waveguides is equal to or higher than a mode diameter of a light wave propagating through each of the branched waveguides.

(3) In the optical modulator according to (1) or (2), a branched waveguide in which a length from the branch point of the first branching part to the second branching part is larger has a smaller maximum value of a curvature.

(4) The optical modulator according to any one of (1) to (3), the branched waveguide has a circular arc with a constant curvature or a straight line in the middle of the transition curve of which a curvature changes.

According to the present invention, an optical modulator includes an optical waveguide formed on a substrate, and modulates a light wave propagating through the optical waveguide, in which the optical waveguide has a configuration in which a plurality of branching parts are connected to each other in multiple stages, in which each of branched waveguides that are branched from a branch point of a first branching part among the plurality of branching parts has a transition curve of which a curvature changes and a circular arc with a constant curvature or a straight line, in which, in a predetermined section from the branch point, each of the branched waveguides is formed by the transition curve starting from a curvature of 0, and a curvature change and a width change of the optical waveguide are set to be symmetric between the branched waveguides, and in which second branching parts formed in the respective branched waveguides are disposed at different positions between the branched waveguides in a direction along a propagation axis of the optical waveguide. Therefore, it is possible to provide an optical modulator in which an arrangement wiring is reduced, a branch ratio in a branching part can be maintained to be a one-to-one ratio, and losses of light waves propagating through respective branched waveguides can be maintained to be the same as each other.

DETAILED DESCRIPTION OF THE INVENTION

An optical modulator according to the present invention will be described in detail by using preferable examples.

As illustrated in FIGS. 1 to 4, n optical modulator of the present invention includes an optical waveguide 2 formed on a substrate 1 and modulates a light wave propagating through the optical waveguide, in which the optical waveguide has a configuration in which a plurality of branching parts 20 to 22 are connected to each other in multiple stages, in which each of branched waveguides 20a and 20b that are branched from a branch point of a first branching part 20 among the plurality of branching parts has a transition curve of which a curvature changes, in which, in a predetermined section from the branch point, each of the branched waveguides is formed by the transition curve starting from a curvature of 0, and a curvature change and a width change of the optical waveguide are set to be symmetric between the branched waveguides, and in which second branching parts 21 and 22 formed in the respective branched waveguides are disposed at different positions between the branched waveguides in a direction (a direction of an arrow X in FIG. 2) along a propagation axis of the optical waveguide.

Figure 1:
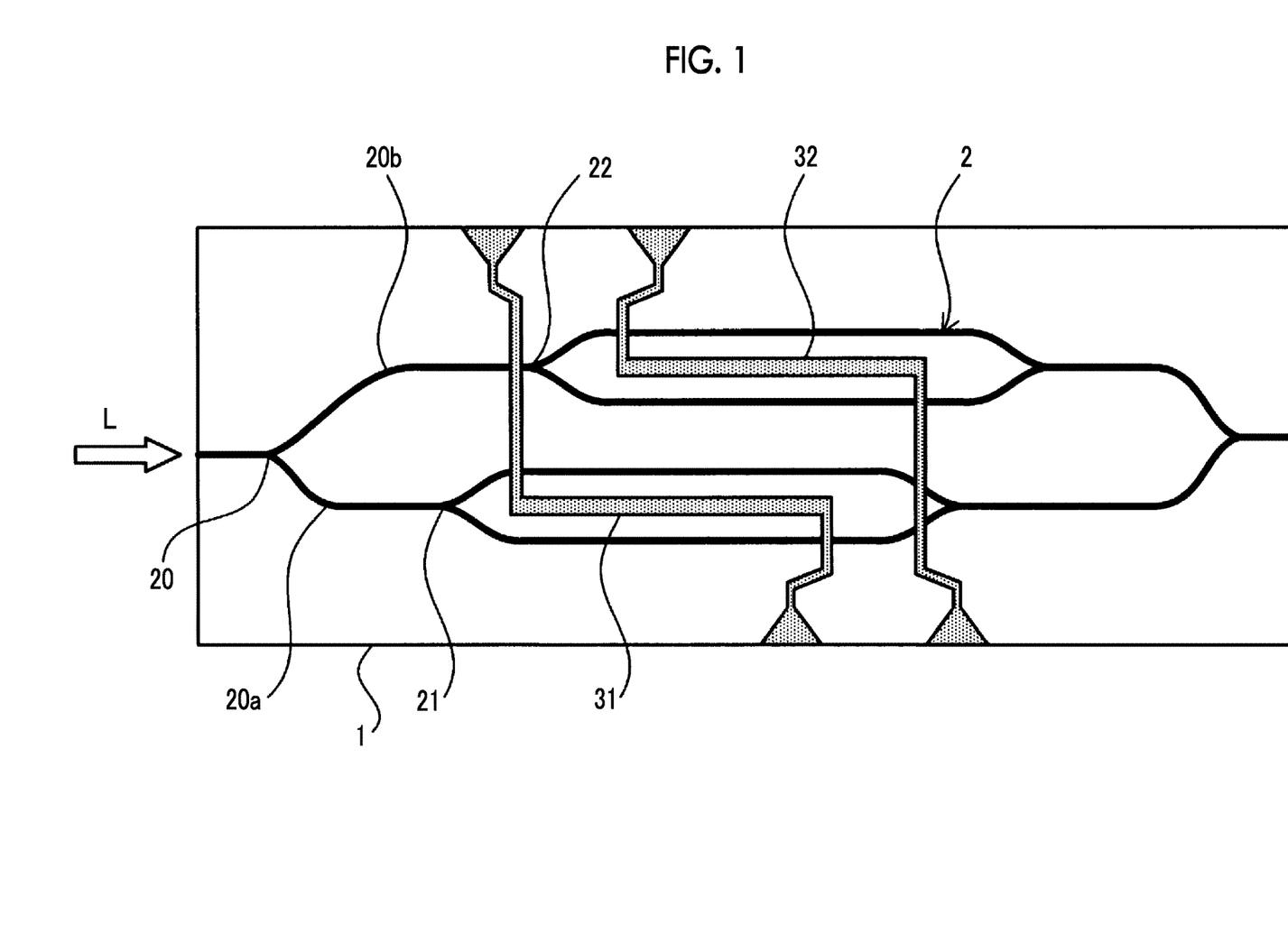
FIG. 1 is a diagram illustrating Example 1 related to an optical modulator of the present invention.

FIG. 1 is a plan view illustrating Example 1 related to an optical modulator of the present invention, and the optical waveguide 2 and modulation electrodes 31 and 32 are formed on the substrate 1. L indicates a light wave that is input to the optical waveguide 2. In FIG. 1, a ground electrode or a bias electrode is not illustrated. FIG. 1 illustrates an example of electrode disposition in a case where the substrate 1 is of an X-cut type, and a Z-cut type substrate may be used.

As the substrate 1, a substrate having an electro-optic effect, made of lithium niobate (LN), InP, or Si may be used. As in a plane light circuit (PLC), a branching part or the like may be configured by using a substrate in which a part of the substrate except for a portion where an electric field is applied with modulation electrodes or bias electrodes increases a refractive index difference between the substrate and an optical waveguide, such as a quartz substrate or a Si substrate. As a waveguide structure, various structures such as a rib type waveguide structure or a buried type waveguide structure may be used in addition to a diffused waveguide structure used in LN.

A feature of the optical modulator of the present invention is that, in a case where other branching parts 21 and 22 are disposed on subsequent stages of branched waveguides 20a and 20b branched from a branching part 20 in FIG. 1, the branching part 21 and the branching part 22 are disposed to be positionally deviated relative to each other in a propagation direction (a horizontal direction in FIG. 1) of the light L.

In order to secure disposition of the branching parts 21 and 22 on the subsequent stages, it is necessary that, in the branching part 20, lengths of the branched waveguide 20a and the branched waveguide 20b are different from each other, and a branch ratio in the branching part is maintained to be a one-to-one ratio and losses of light waves propagating through the respective branched waveguides are maintained to be the same as each other through examination of a shape of an optical waveguide of the branching part.

Figure 2:
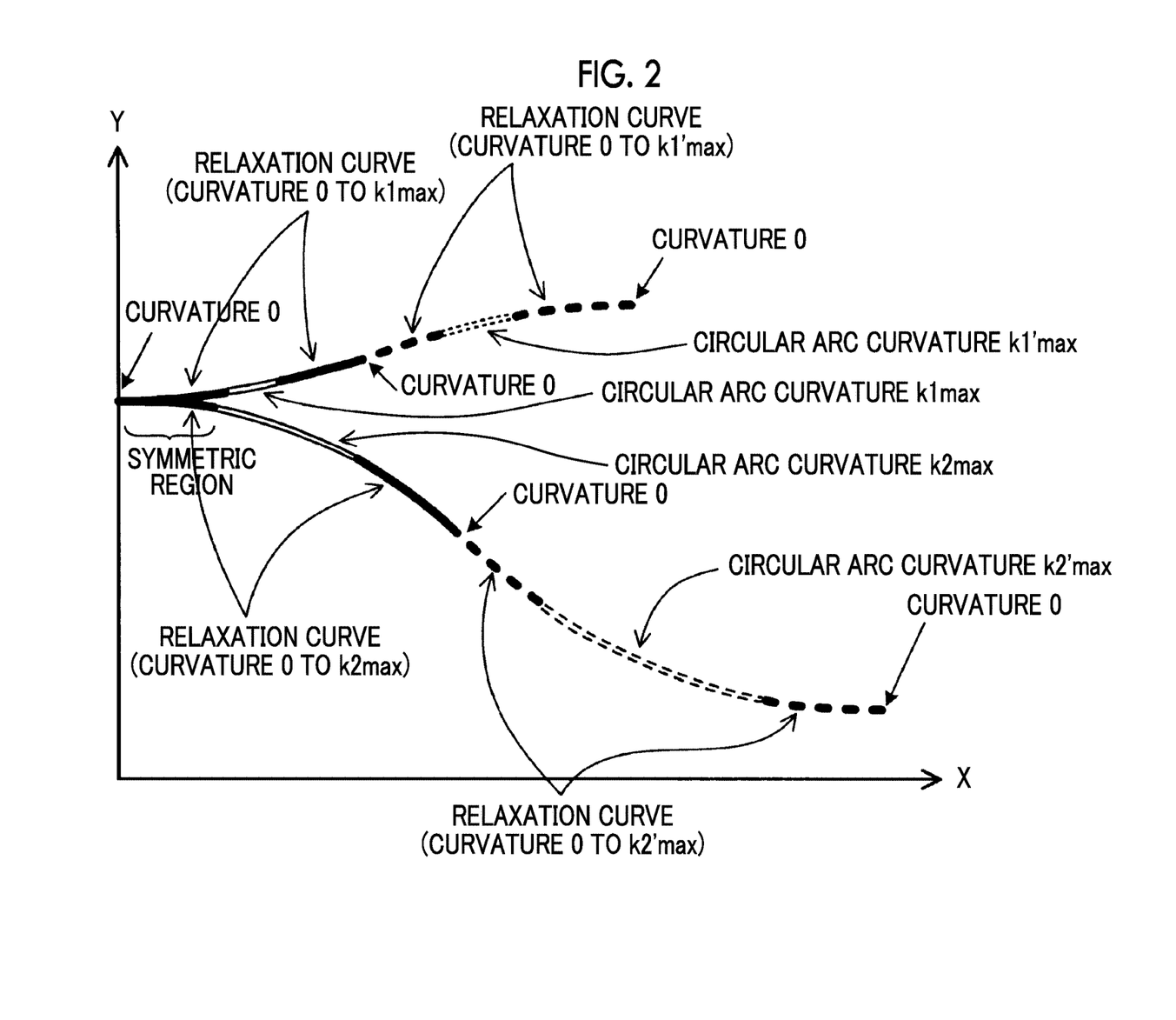
FIG. 2 is a diagram for describing a configuration of a branching part related to the optical modulator of the present invention.

Regarding a specific configuration of the branching part, as illustrated in FIG. 2, a transition curve of which a curvature changes is used for the branched waveguide.

As an example of the transition curve, a clothoid curve or a cubic function of which a curvature constantly changes may be preferably used. A sinusoidal curve or a curve of which a curvature variation smoothly changes may also be used. However, as will be described later, it is easy to use a cubic function or a clothoid curve in obtaining a transition curve in which a curvature change near a branching part is identical and that is connected to a curve with a different curvature.

Figure 3:
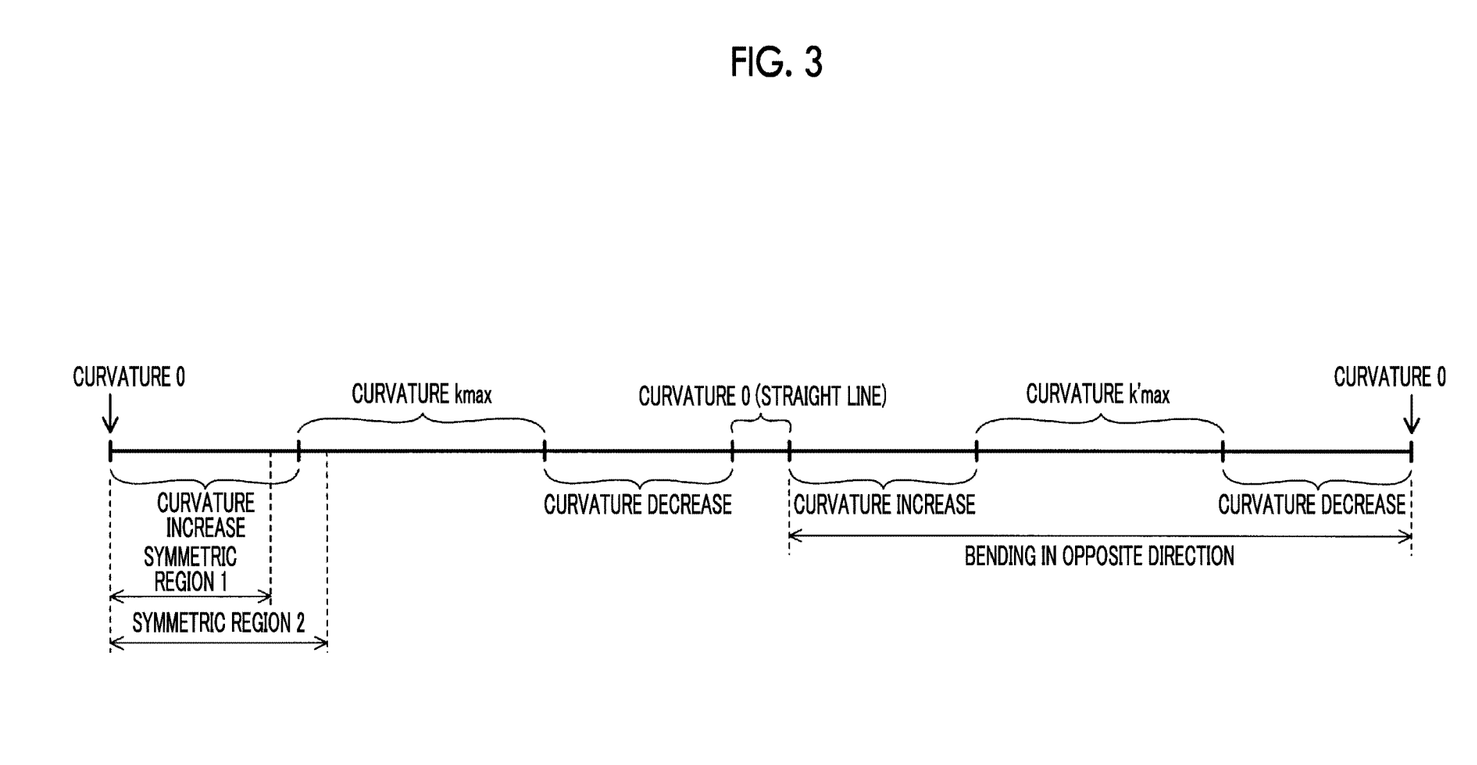
FIG. 3 is a diagram illustrating a curvature change of a branched waveguide in the branching part.

FIG. 3 illustrates a curvature change focusing on a single branched waveguide in FIG. 2.

A left end of a straight line in FIG. 3 corresponds to a branch point of a branching part. A curvature gradually increases from 0, reaches the maximum value (curvature kmax), then gradually decreases, and then becomes 0. Thereafter, the branched waveguide is bent in an opposite direction. A curvature change at that time occurs such that a curvature gradually increases, reaches the maximum value (curvature k'max), then gradually decreases, and then becomes 0. A transition curve is used in a portion where a curvature changes.

In FIG. 2 (or FIG. 3), a circular arc portion with a constant curvature such as a curvature of k1max or k1'max, or a curvature of k2max or k2'max (in FIG. 3, a curvature is kmax or k'max) is provided at a change point at which the curvature increases and then decreases.

The circular arc portion with a constant curvature enables a bent portion of the optical waveguide to be compactly configured while suppressing an optical loss and thus contributes to miniaturization of the optical modulator.

In suppressing an optical loss of the optical waveguide, there is a restriction (upper limit) not only on a usable curvature but also on a change ratio of a usable curvature. Thus, applying a structure in which a transition curve is combined with a circular arc with a constant curvature to bending of the branched waveguide is useful to make bent portions compact.

As illustrated in FIG. 2, the lower branched waveguide has a larger length from the branch point to the branching part on the subsequent stage than that of the upper branched waveguide. Thus, an optical loss of a light wave propagating through the lower branched waveguide tends to increase. However, the maximum curvature (k2max or k2'max) of the lower branched waveguide has a value smaller than that of the maximum curvature (k1max or k1'max) of the upper branched waveguide. Consequently, bending of the longer branched waveguide is mitigated, and thus it is possible to reduce an excessive loss due to the bending. As a result, intensities of light waves entering the branching parts on the subsequent stages from the respective branched waveguides can be maintained to be substantially constant between the branched waveguides.

The maximum curvature of k1max (k2max) of the branched waveguide of the first half may or not be the same as the maximum curvature of k1'max (k2'max) of the branched waveguide of the second half. In a case where the maximum curvatures thereof are the same as each other, bent portions can be made more compact.

Although not illustrated in FIG. 2, as illustrated in FIG. 3, a straight line (curvature of 0) maybe inserted into a portion of which a curvature is 0. A straight line portion may be disposed between transition curves, and may be disposed after a right end of the straight line with the curvature of 0 in FIG. 3 such that a position of a branching part (or an operation start point of a modulation electrode) on the subsequent stage is adjusted (deviated backward).

Figure 4:
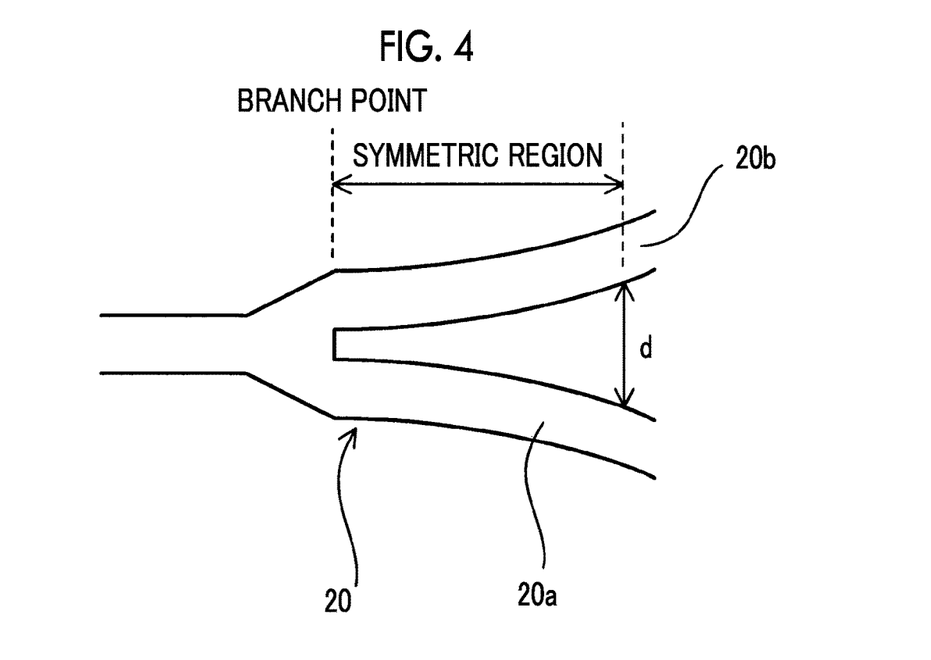
FIG. 4 is a diagram for describing a symmetric region in the branching part.

As a feature of the optical modulator of the present invention, as illustrated in FIG. 4, in a predetermined section from the branch point of the branching part, each of the branched waveguides 20a and 20b is formed by a transition curve starting from a curvature of 0, and a curvature change and a width change of the optical waveguide are set to be symmetric between the branched waveguides 20a and 20b. Consequently, a light wave in the branching part can be branched at a one-to-one branch ratio.

As illustrated in FIG. 3, a symmetric region may be set (symmetric region 1) within a range of a transition curve (a portion where a curvature increases), and may be set (symmetric region 2) within a range up to a circular arc portion with a constant curvature (curvature of kmax) after the transition curve.

As illustrated in FIG. 4, an end of a predetermined section of the symmetric region is set to a portion where the branched waveguides 20a and 20b are separated from each other by a predetermined distance d or higher. An unstable region in which a light wave propagating through one branched waveguide may transfer to another branched waveguide is set to a symmetric region, and a stable portion in which transfer does not occur is excluded from a symmetric region, so that a one-to-one branch ratio can be ensured. The distance d is preferably set to at least one time the mode diameter of a light wave propagating through the branched waveguide.

Figure 5:
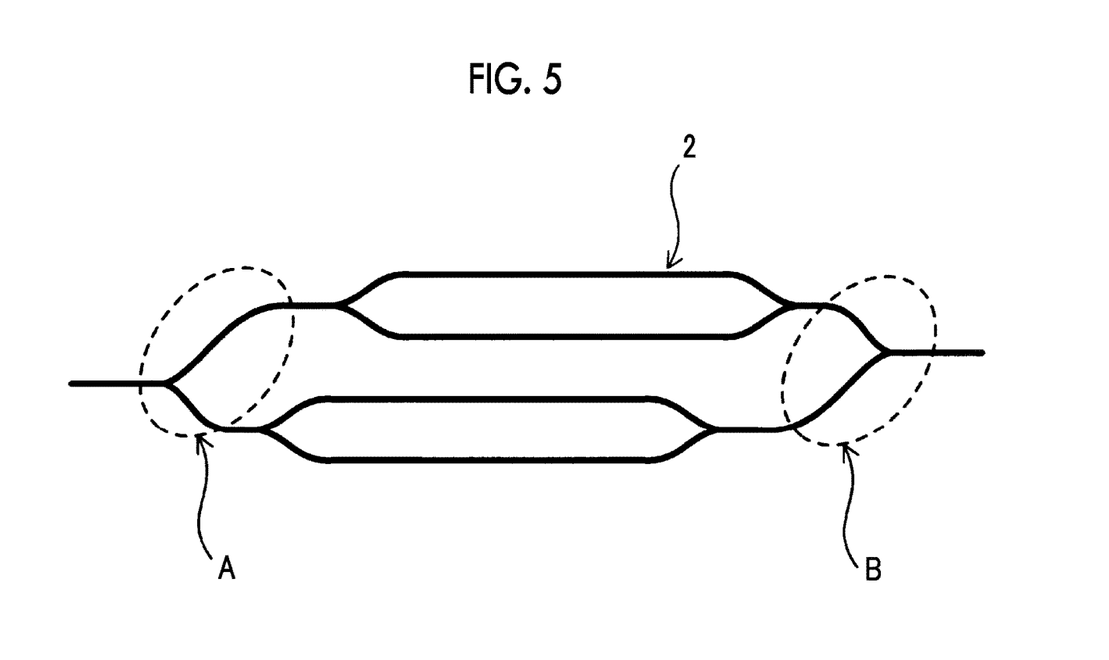
FIG. 5 is a diagram illustrating Example 2 related to an optical modulator of the present invention.

FIG. 5 is a diagram illustrating Example 2 related to an optical modulator of the present invention. Specifically, a branching part using a transition curve is provided not only on a branching side (dotted line A) of the nest type optical waveguide 2 but also on a combining side (dotted line B). Lengths of the branched waveguides on the branching side and the combining side are alternately replaced with each other, and thus optical path lengths of respective arms of the parent Mach-Zehnder structure of the nest type optical waveguide can be matched with each other.

Figure 6:
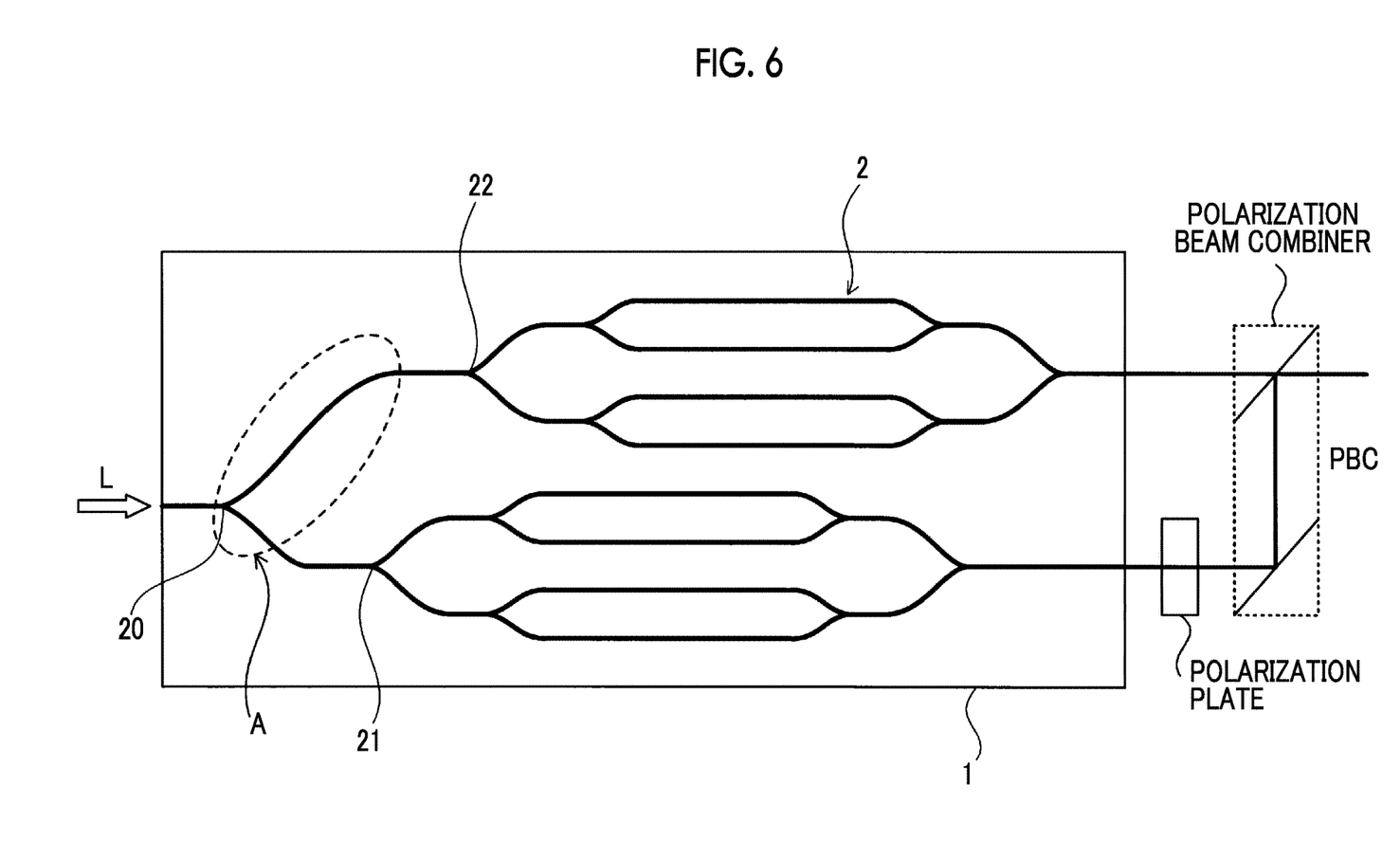
FIG. 6 is a diagram illustrating Example 3 related to an optical modulator of the present invention.

FIG. 6 is a diagram illustrating Example 3 related to an optical modulator of the present invention, and, a polarization combining type optical modulator, a branching part using a transition curve is used as a branching part (dotted line A).

After modulation, of two light waves radiated from the substrate 1, one light wave is subjected to rotation of a polarization plane in a polarization plate, and thus the light waves are combined with each other in a state in which polarization planes are orthogonal to each other in a polarization beam splitter used as a polarization beam combiner (PBC).

Figure 7:
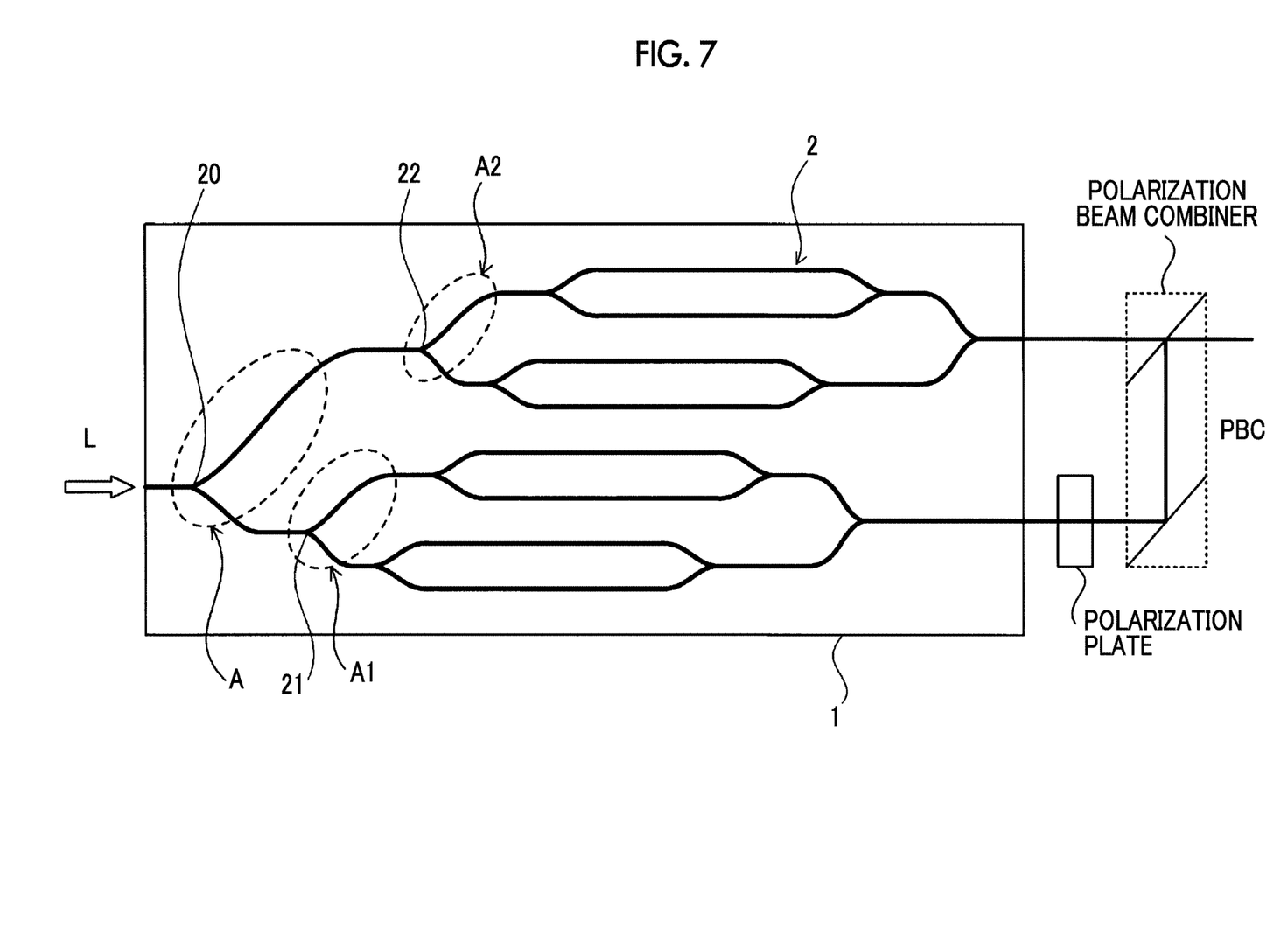
FIG. 7 is a diagram illustrating Example 4 related to an optical modulator of the present invention.

FIG. 7 illustrates an application example of the optical modulator illustrated in FIG. 6, and is a diagram illustrating Example 4 related to an optical modulator of the present invention. A principal feature is that a branching part using a transition curve is used not only for the first branching part 20 but also for the second branching parts 21 and 22. With this configuration, the optical waveguide can be miniaturized, a branch ratio can be maintained to be a one-to-one ratio, and an optical propagation loss can be suppressed.

Figure 8:
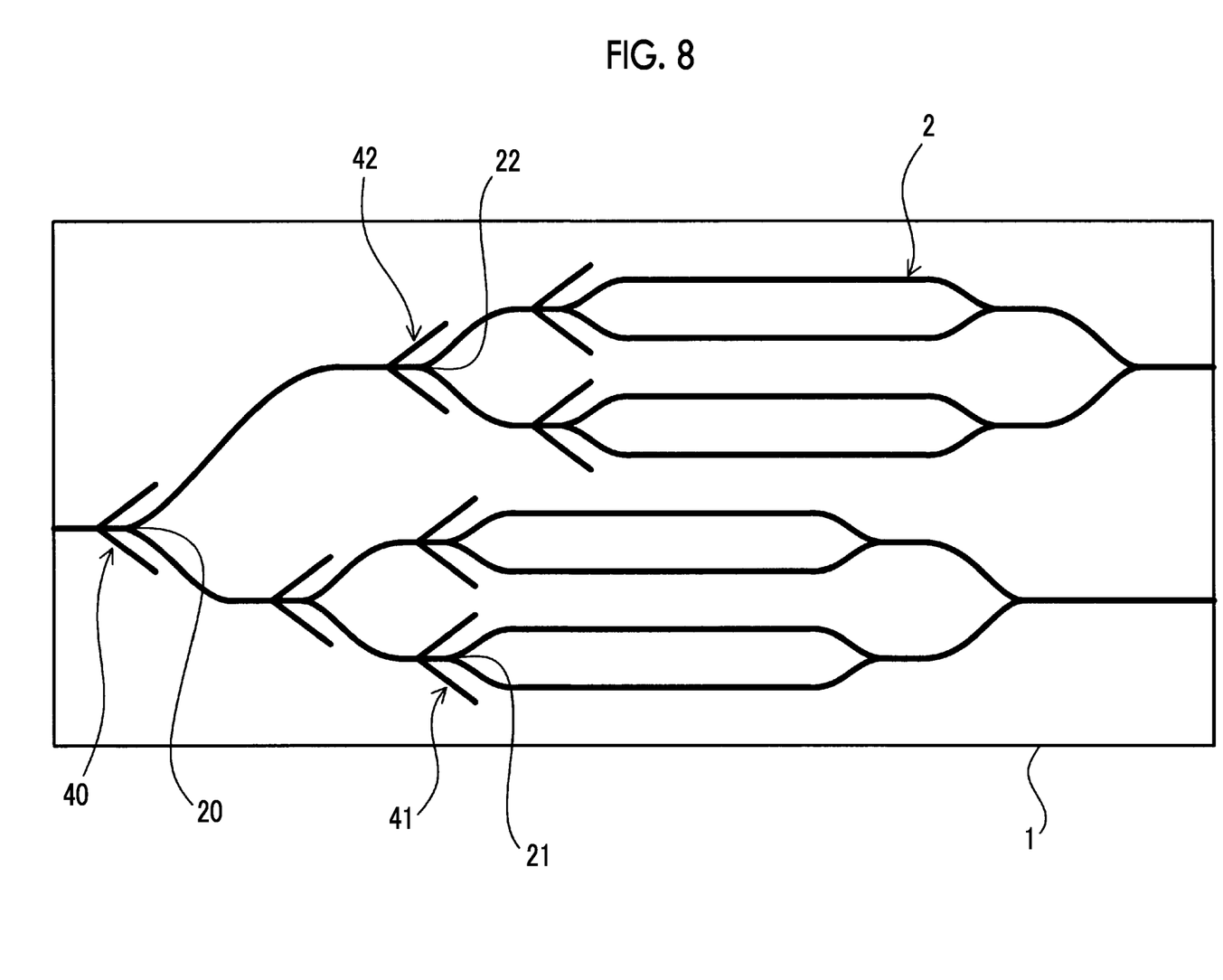
FIG. 8 is a diagram illustrating Example 5 related to an optical modulator of the present invention.

As Example 5 related to an optical modulator of the present invention is illustrated in FIG. 8, there may be a configuration in which a three-branched structure of an optical waveguide is employed on preceding stages of the branching parts 20 to 22, and thus an oscillation portion (high-order mode light) of a light wave propagating through the optical waveguide is removed. Consequently, a branch ratio in a branching part can be stably maintained to be a one-to-one ratio. The three-branched structure on the preceding stage of the branching part 20 removes an oscillation portion of a light wave generated when the externally input light wave is coupled to the optical waveguide 2 of the substrate 1. On the other hand, the three-branched structures on the preceding structures of the branching parts 21 and 22 remove oscillation portions of light waves generated in the branching parts (branch points, or bent portions of the branched waveguides).

An optical waveguide formed on the substrate 1 may be formed by diffusing Ti into an LN substrate, and may be a ridge optical waveguide in which grooves are formed along the optical waveguide. A technique well known to a person skilled in the art, such as a configuration for achieving velocity matching between a light wave and a microwave (modulation signal) by using a thin plate structure in which a thickness of a substrate is set to 20 μm or lower, maybe incorporated into the optical modulator of the present invention.

In a case where the substrate 1 has anisotropy in a refractive index in a propagation direction (an X axis in FIG. 2) of a light wave propagating through the optical waveguide and a direction (a Y axis in FIG. 2) perpendicular thereto, it is necessary to use a symmetric structure in which a central axis of a branch start point matches the propagation direction (X axis) in order to obtain a one-to-one branch ratio. An S-shaped curve in which a transition curve and a circular arc with an identical curvature change and different bent directions are combined with each other is used, and thus a direction of an end point of the curve can be set to the propagation direction (X axis direction). Consequently, a direction of a subsequent-stage branching part to be connected can be matched with the X axis direction, and thus it is possible to easily configure a structure in which a branch ratio is a one-to-one ratio in multiple-stage branching.

As described above, according to the present invention, it is possible to provide an optical modulator in which an arrangement wiring is reduced, a branch ratio in a branching part can be maintained to be a one-to-one ratio, and losses of light waves propagating through respective branched waveguides can be maintained to be the same as each other.

What is claimed is:
1. An optical modulator comprising:
an optical waveguide formed on a substrate,
wherein the optical modulator modulates a light wave propagating through the optical waveguide,
wherein the optical waveguide has a configuration in which a plurality of branching parts are connected to each other in multiple stages,
wherein each of branched waveguides that are branched from a branch point of a first branching part among the plurality of branching parts has a transition curve of which a curvature changes,
wherein, in a predetermined section from the branch point, each of the branched waveguides is formed by the transition curve starting from a curvature of 0, and a curvature change and a width change of the optical waveguide are set to be symmetric between the branched waveguides, wherein second branching parts formed in the respective branched waveguides are disposed at different positions between the branched waveguides in a direction along a propagation axis of the optical waveguide, and wherein an end point of the predetermined section is a position where a distance between the branched waveguides is equal to or higher than a mode diameter of a light wave propagating through each of the branched waveguides.

2. The optical modulator according to claim 1, wherein a branched waveguide in which a length from the branch point of the first branching part to the second branching part is larger has a smaller maximum value of a curvature.

3. The optical modulator according to claim 1, wherein the branched waveguide has a circular arc with a constant curvature or a straight line in the middle of the transition curve of which a curvature changes.

* * * * *